(12) United States Patent
Jia et al.

(10) Patent No.: US 9,154,230 B2
(45) Date of Patent: Oct. 6, 2015

(54) OPTICAL SIGNAL CONTROL METHOD, OPTICAL SIGNAL CONTROL SYSTEM AND OPTICAL BACKPLANE SYSTEM

(71) Applicant: Huawei Technologies Co., Ltd., Shenzhen, Guangdong (CN)

(72) Inventors: Gongxian Jia, Shenzhen (CN); Weixia Liu, Shenzhen (CN); Baoqi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 13/787,389

(22) Filed: Mar. 6, 2013

(65) Prior Publication Data

US 2013/0202288 A1     Aug. 8, 2013

Related U.S. Application Data

(63) Continuation of application No. PCT/CN2011/084790, filed on Dec. 28, 2011.

(30) Foreign Application Priority Data

Mar. 29, 2011   (CN) .......................... 2011 1 0078374

(51) Int. Cl.
*H04B 10/80* (2013.01)
*H04B 10/25* (2013.01)
(52) U.S. Cl.
CPC .............. *H04B 10/25* (2013.01); *H04B 10/801* (2013.01)
(58) Field of Classification Search
CPC .................................................... H04B 10/801
See application file for complete search history.

(56) References Cited

U.S. PATENT DOCUMENTS

| 5,708,745 | A | 1/1998 | Yamaji et al. |
| 5,999,411 | A * | 12/1999 | Patel ............................ 361/759 |
| 2003/0084359 | A1 | 5/2003 | Bresniker et al. |
| 2004/0102084 | A1 * | 5/2004 | Bozso et al. .................. 439/501 |
| 2005/0254827 | A1 | 11/2005 | Hopkins et al. |

(Continued)

FOREIGN PATENT DOCUMENTS

| CN | 1738220 A | 2/2006 |
| CN | 101159590 A | 4/2008 |

(Continued)

OTHER PUBLICATIONS

Communication dated Jul. 19, 2013 in connection with European Patent Application No. EP 11 86 2391.

(Continued)

*Primary Examiner* — Nathan Curs

(57) ABSTRACT

The present invention provides an optical signal control method, an optical signal control system and an optical backplane system, which belongs to the field of optical communications technologies. The method includes: detecting whether a circuit board is pulled out from an optical backplane; if the circuit board is pulled out, querying a transmitting port of another circuit board connected to a slot where the pulled out circuit board is located, transmitting a first control instruction to the transmitting port, and notifying of closing the transmitting port or adjusting output power of the transmitting port to make it below a preset threshold. The optical signal control system includes: a detection module and a control module. The optical backplane system includes the optical signal control system.

16 Claims, 8 Drawing Sheets

(56) References Cited

U.S. PATENT DOCUMENTS

2006/0188265 A1* 8/2006 Maul et al. .................. 398/166
2010/0119223 A1   5/2010 Ferrari et al.
2012/0195548 A1* 8/2012 Brunner et al. ................ 385/18

FOREIGN PATENT DOCUMENTS

| CN | 102255653 A | 11/2011 |
| EP | 1 788 727 A1 | 5/2007 |
| JP | 1993-333226 A | 12/1993 |

OTHER PUBLICATIONS

International Search Report dated Mar. 29, 2012 in connection with International Patent Application No. PCT/CN2011/084790.
ITU-T, "Optical safety procedures and requirements for optical transport systems", ITU-T Recommendation G.664, Mar. 2006, 25 pages.
ITU-T, "Optical safety procedures and requirements for optical transport systems", ITU-T Recommendation G.664, Jun. 1999, 18 pages.
Partial translation of Office Action dated May 14, 2013 in connection with Chinese Patent Application No. 201110078374.1.

* cited by examiner

OPTICAL SIGNAL CONTROL METHOD, OPTICAL SIGNAL CONTROL SYSTEM AND OPTICAL BACKPLANE SYSTEM

CROSS-REFERENCE TO RELATED APPLICATIONS

This application is a continuation of International Application No. PCT/CN2011/084790, filed on Dec. 28, 2011, which claims priority to Chinese Patent Application No. 201110078374.1, filed on Mar. 29, 2011, both of which are hereby incorporated by reference in their entireties.

TECHNICAL FIELD

The present invention relates to the field of optical communications technologies, and in particular, to an optical signal control method, an optical signal control system, and an optical backplane system.

BACKGROUND

A circuit board refers to a printed circuit board inserted into a slot of a backplane, and usually includes: a service board, a switch board and a main control board. One inserted into a service slot of the backplane is called a service board, one inserted into a switch slot of the backplane is called a switch board, and one inserted into a main control slot of the backplane is called a main control board. The switch board includes a switch chip, and in a centralized switching system, data signals on the circuit boards except the switch board may be connected to the switch chip of the switch board, thereby implementing data interchanging between each slot. In a full-interconnect system, data of each service slot may be connected directly. The main control board is a circuit board taking a part in control and management, may be existed independently, and may also be combined with the switch board.

With the increase of signal rates and due to limitation of dielectric loss, crosstalk and power consumption, it is more and more difficult to adopt a conventional electric backplane. The optical backplane system has advantages such as low loss, low crosstalk, high density and independence between a channel characteristic and the rate. Therefore, compared with the electric backplane solution, the optical backplane solution may reach a higher system capacity, and may implement smooth upgrading.

A communication system is usually installed on a rack, and the backplane is perpendicular to an installation surface, so that an operator inserts and pulls out a circuit board conveniently. A connector is installed at each slot of the backplane where multiple connectors may be installed sometimes, and the connector is used to connect the circuit board and the backplane. When the backplane is fully configured, all the slots are inserted with the circuit boards. When the backplane is not fully configured, some slots are inserted with the circuit boards while the rest slots are not inserted with the circuit boards. In an optical backplane system, if the system is in a working state and the circuit board is pulled out from the optical backplane, optical signal leakage may be resulted on the optical connector at the slot where the circuit board is pulled out, and the leakage just faces the operator directly, which may cause injuries to the operator, especially to eyes.

SUMMARY

In order to solve an optical signal leakage problem in an optical backplane system in the prior art, embodiments of the present invention provide an optical signal control method, an optical signal control system and an optical backplane system. The technical solutions are as follows.

An optical signal control method includes:
detecting whether a circuit board is pulled out from an optical backplane; and
if the circuit board is pulled out, querying a transmitting port of another circuit board connected to a slot where the pulled out circuit board is located, and transmitting a first control instruction to the transmitting port, where the first control instruction is used to notify of closing the transmitting port or adjusting output power of the transmitting port to make it below a preset threshold, and the preset threshold is a specified boundary value used to determine whether the transmitting port is in a working state.

An optical signal control system includes:
a detection module, configured to detect whether a circuit board is pulled out from an optical backplane; and
a control module, configured to: if the detection module detects that the circuit board is pulled out, query a transmitting port of another circuit board connected to a slot where the pulled out circuit board is located, and transmit a first control instruction to the transmitting port, where the first control instruction is used to notify of closing the transmitting port or adjusting output power of the transmitting port to make it below a preset threshold, and the preset threshold is a specified boundary value used to determine whether the transmitting port is in a working state.

An optical backplane system includes an optical backplane and a circuit board, where the optical backplane system includes the optical signal control system. The optical backplane has more than two slots, where at least one slot of the more than two slots is the slot where the pulled out circuit board is located, and at least one slot in the rest slots is inserted with another circuit board. The optical signal control system is located in a slot having no optical connector or a slot having an optical connector in the more than two slots.

Beneficial effects of technical solutions provided by the embodiments of the present invention are as follows.

Through detecting whether a circuit board is pulled out from an optical backplane, and when the circuit board is pulled out, transmitting a first control instruction to a transmitting port of another circuit board connected to a slot where the pulled out circuit board is located, and notifying of closing the transmitting port or adjusting output power thereof to make it below a preset threshold, optical signal leakage of the optical connector on the slot where the pulled out circuit board is located is prevented, injuries to an operator, especially to eyes, are avoided. In addition, through closing an optical channel not in working, power consumption of the system may be reduced, besides, through controlling based on a slot instead of controlling based on each optical path, optical path detection for each optical path is not needed, thereby greatly reducing complexity and system costs.

BRIEF DESCRIPTION OF THE DRAWINGS

To illustrate the technical solutions in the embodiments of the present invention more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without making creative efforts.

DETAILED DESCRIPTION

To make the objectives, technical solutions, and advantages of the present invention more comprehensible, the following describes the embodiments of the present invention in further detail below with reference to the accompanying drawings.

Embodiment 1

Figure 1:
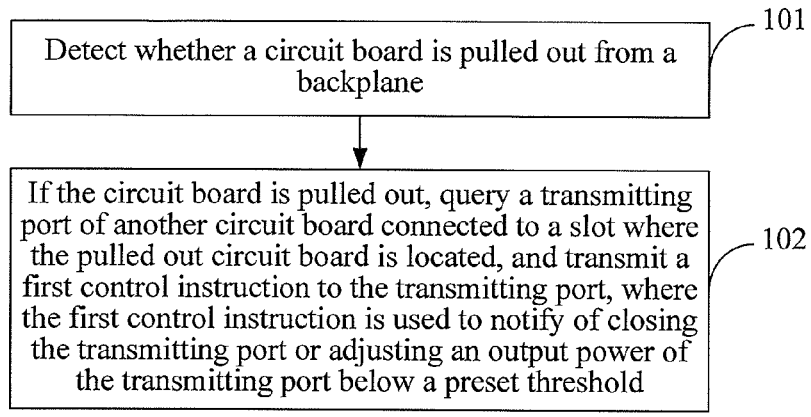
FIG. 1 is a flow chart of an optical signal control method provided by Embodiment 1 of the present invention.

Referring to FIG. 1, this embodiment provides an optical signal control method, where the method includes:

101: Detect whether a circuit board is pulled out from an optical backplane.

102: If the circuit board is pulled out, query a transmitting port of another circuit board connected to a slot where the pulled out circuit board is located, and transmit a first control instruction to the transmitting port, where the first control instruction is used to notify of closing the transmitting port or adjusting output power of the transmitting port to make it below a preset threshold, and the preset threshold is a specified boundary value used to determine whether the transmitting port is in a working state.

In this embodiment, the optical backplane at least has two data slots, and a data slot includes a service board slot or a switch board slot, one of the data slots acts as a slot where the pulled out circuit board is located, and the other or multiple of the data slots act as a slot where another circuit board is located. The slot where the circuit board is located has an optical connector which is used for connection of optical signals, and also has an electric connector which is used for transmission of the first control instruction. The circuit board usually has the transmitting port TX (Transmit) port and a receiving port RX (Receive) port, where the TX port is used to transmit an optical signal, and the RX port is used to receive the optical signal. Each circuit board may have a group of TX and RX ports, and may also have multiple groups of TX and RX ports.

Step 101 may include:

detecting whether the circuit board is pulled out from the optical backplane according to an in-position detection signal on the optical backplane, or according to the in-position detection signal and an insertion stable detection signal on the optical backplane; or detecting whether the circuit board is pulled out from the optical backplane according to an open-closed detection signal generated after a user operates a control button, or according to a notification signal of inserting the circuit board transmitted by the user through a software interface.

Specifically, the detecting whether the circuit board is pulled out from the optical backplane may adopt any one of the following manners:

detect the in-position detection signal on the optical backplane, if the in-position detection signal is a specified first level, determine that the circuit board is pulled out from the optical backplane; and if the in-position detection signal is a specified second level, determine that the circuit board is inserted into the optical backplane, where the specified first level is a high level, and the second level is a low level; or the first level is a low level, and the second level is a high level;

detect the insertion stable detection signal and the in-position detection signal on the optical backplane, if the insertion stable detection signal is a specified third level and the in-position detection signal is a specified fourth level, determine that the circuit board is pulled out from the optical backplane; and if both the insertion stable detection signal and the in-position detection signal are the fourth level, determine that a circuit board is inserted into the optical backplane, where the specified third level is a high level, and the fourth level is a low level; or the third level is a low level, and the fourth level is a high level;

detect the open-closed detection signal generated after the user operates the control button, if the open-closed detection signal is a closed signal, determine that the circuit board is pulled out from the optical backplane; and if the open-closed detection signal is an opened signal, determine that the circuit board is inserted into the optical backplane; and receive a notification signal of inserting the circuit board transmitted by the user through a software interface, if the notification signal indicates that the circuit board is pulled out, determine that the circuit board is pulled out from the optical backplane; and if the notification signal indicates that the circuit board is inserted, determine that the circuit board is inserted into the optical backplane.

In this embodiment, the foregoing method further includes: if a circuit board is inserted, query a transmitting port of another circuit board connected to a slot where the inserted circuit board is located, and transmit a second control instruction to the transmitting port, where the second control instruction is used to notify of opening the transmitting port or adjusting output power of the transmitting port to make it above the preset threshold.

Optionally, other circuit boards connected to the slot where the pulled out circuit board is located may be all or a part of the circuit boards except the pulled out circuit board on the optical backplane. In the same way, other circuit boards connected to the slot where the inserted circuit board is located may also be all or a part of the circuit boards except the inserted circuit board on the optical backplane. The querying relating to the pulled out circuit board and the inserted circuit board may be performed in a mapping relationship table between a transmitting port and a slot, and the querying result may be one or more transmitting ports.

Optionally, the preset thresholds relating to both the first control instruction and the second control instruction may be set or changed according to a need. The preset threshold is a specified boundary value used to determine whether the transmitting port is in a working state, and usually is a tiny value. When the output power of the transmitting port of the circuit board is below the threshold, it is considered that the transmitting port is not in the working state, and therefore, no optical signal is leaked. When the output power of the transmitting port of the circuit board is above the threshold, it is considered that the transmitting port is in the working state, and may perform optical signal transmission with other ports.

The circuit board in this embodiment includes, but is not limited to: a service board, a switch board, a main control board, and a circuit board that integrates a switch board and a main control board.

In this embodiment, the in-position detection signal is used to indicate whether the circuit board is in-position, the insertion stable detection signal is used to indicate whether the circuit board is inserted stably, the open-closed detection signal is used to indicate an inserted state and a pulled-out state of the circuit board, and the notification signal is used to indicate an inserted state and a pulled-out state of the circuit board.

In the foregoing method provided in this embodiment, through detecting whether a circuit board is pulled out from an optical backplane, and when a circuit board is pulled out, transmitting a first control instruction to a transmitting port of another circuit board connected to a slot where the pulled out circuit board is located, and notifying of closing the transmitting port or adjusting output power thereof to make it below a preset threshold, optical signal leakage of the optical connector on the slot where the pulled out circuit board is located is prevented, thereby avoiding injuries to an operator, especially to eyes. In addition, through closing an optical channel not in working, power consumption of the system may be reduced, besides, through controlling based on a slot instead of controlling based on each optical path, optical path detection for each optical path is not needed, thereby greatly reducing complexity and system costs.

Embodiment 2

Figure 2:
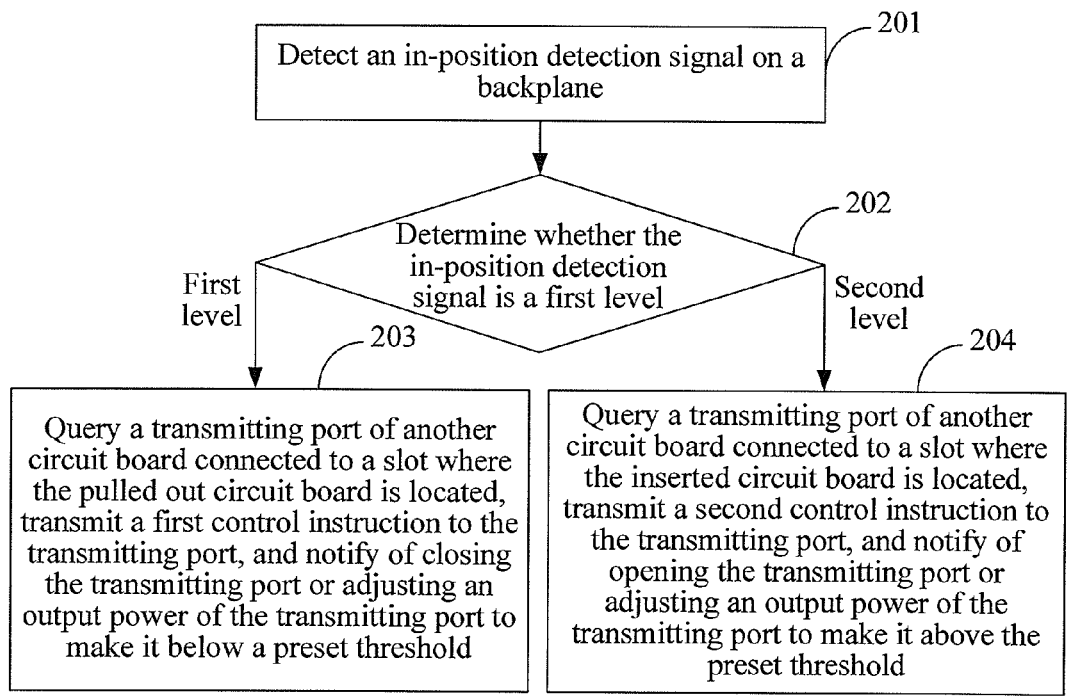
FIG. 2 is a flow chart of a first optical signal control method provided by Embodiment 2 of the present invention.

Referring to FIG. 2, this embodiment provides an optical signal control method, in which control is performed based on an in-position detection signal. The method includes the following:

201: Detect an in-position detection signal on an optical backplane.

202: Determine whether the in-position detection signal is a specified first level, if the in-position detection signal is the specified first level, execute 203; and if the in-position detection signal is a specified second level, execute 204.

The specified first level is a high level, and the second level is a low level; or the specified first level is a low level, and the second level is a high level.

203: Determine that a circuit board is pulled out from the optical backplane, query a transmitting port of another circuit board connected to a slot where the pulled out circuit board is located, transmit a first control instruction to the transmitting port, and notify of closing the transmitting port or adjusting output power of the transmitting port to make it below a preset threshold, and end the flow.

204: Determine that a circuit board is inserted into the optical backplane, query a transmitting port of another circuit board connected to a slot where the inserted circuit board is located, transmit a second control instruction to the transmitting port, and notify of opening the transmitting port or adjusting output power of the transmitting port to make it above the preset threshold, and end the flow.

Figure 3:
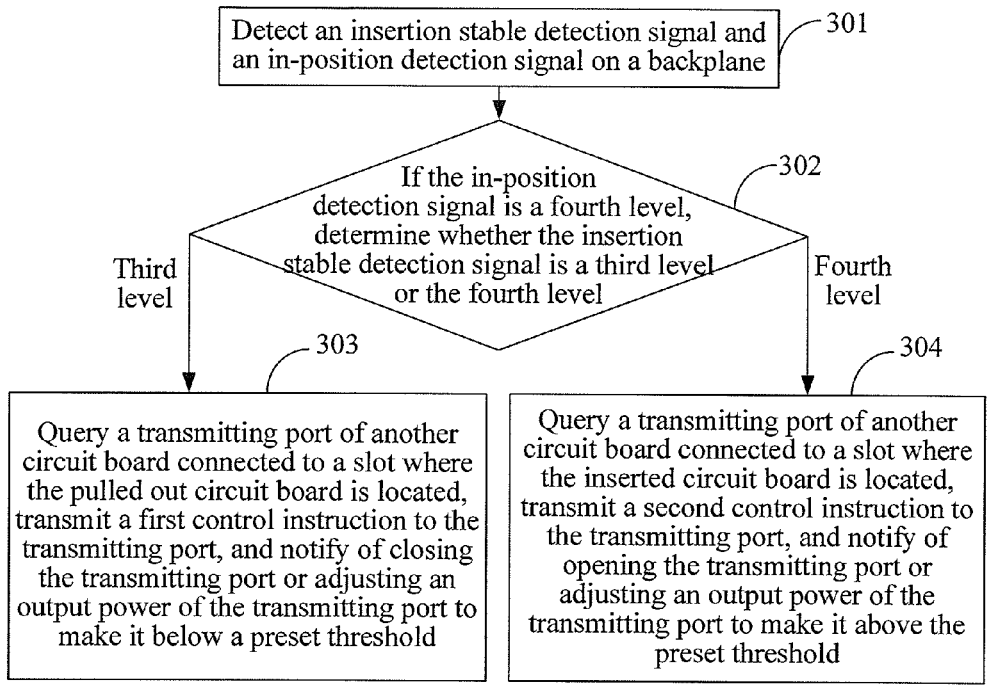
FIG. 3 is a flow chart of a second optical signal control method provided by Embodiment 2 of the present invention.

Referring to FIG. 3, this embodiment further provides an optical signal control method, in which control is performed based on an insertion stable detection signal and an in-position detection signal. The method includes the following:

301: Detect an insertion stable detection signal and an in-position detection signal on an optical backplane.

302: If the in-position detection signal is a specified fourth level, determine whether the insertion stable detection signal is a specified third level or the fourth level, and if the insertion stable detection signal is the third level, execute 303; and if the insertion stable detection signal is the fourth level, execute 304.

The specified third level is a high level, and the fourth level is a low level; or the third level is a low level, the fourth level is a high level.

303: Same as 203.
304: Same as 204.

Figure 4:
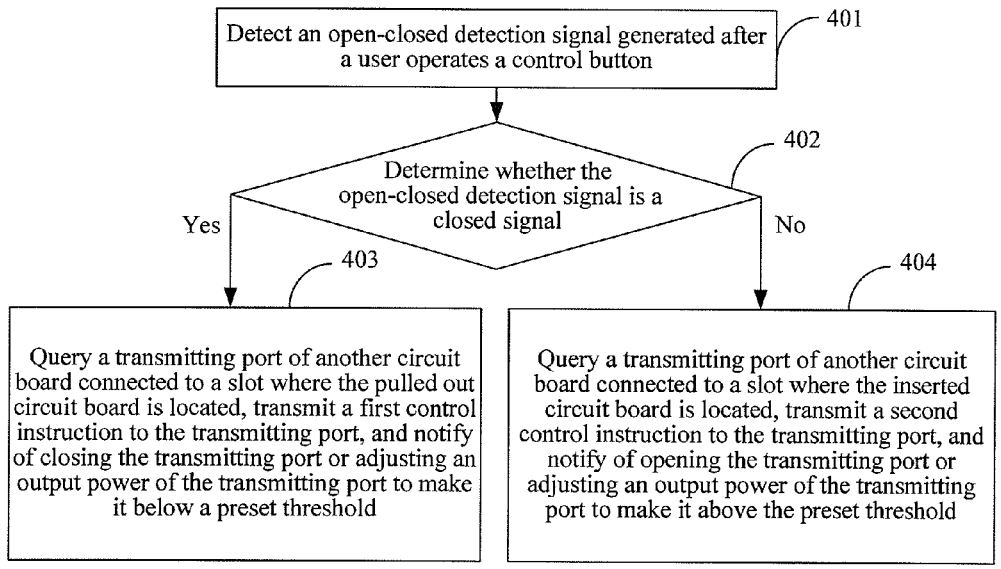
FIG. 4 is a flow chart of a third optical signal control method provided by Embodiment 2 of the present invention.

Referring to FIG. 4, this embodiment further provides an optical signal control method, in which control is performed based on an open-closed detection signal. The method includes the following:

401: Detect an open-closed detection signal generated after a user operates a control button;

402: Determine whether the open-closed detection signal is a closed signal, if the open-closed detection signal is the closed signal, execute 403; and if the open-closed detection signal is an opened signal, execute 404;

403: Same as 203; and
404: Same as 204.

Figure 5:
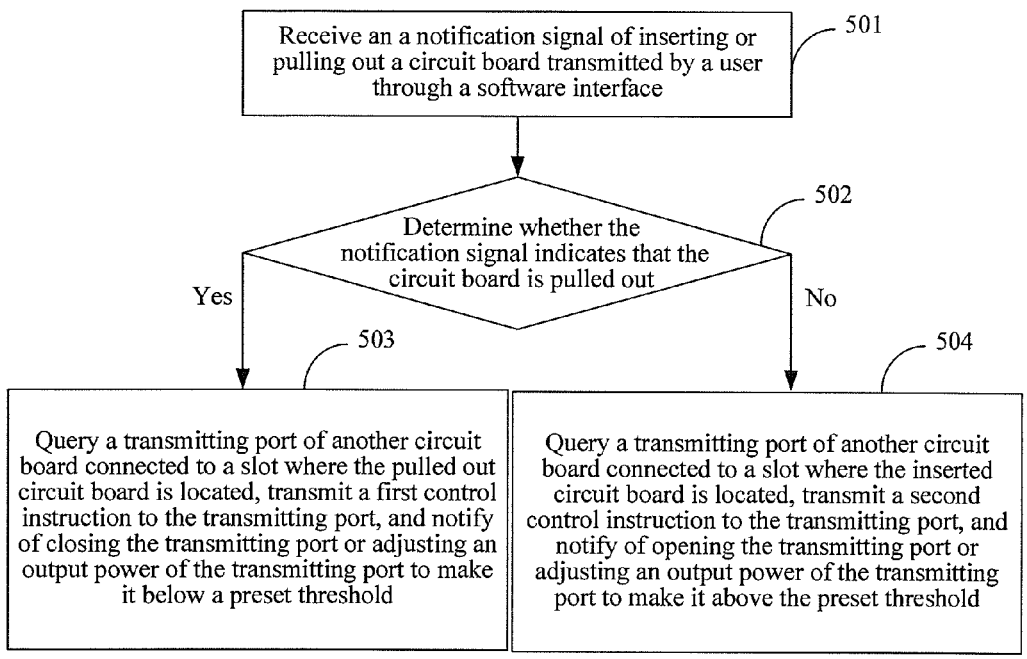
FIG. 5 is a flow chart of a fourth optical signal control method provided by Embodiment 2 of the present invention.

Referring to FIG. 5, this embodiment further provides an optical signal control method, in which control is performed based on a notification signal of a software interface. The method includes the following:

501: Receive an a notification signal of inserting or pulling out a circuit board transmitted by a user through a software interface;

502: Determine whether the notification signal indicates that the circuit board is pulled out; if the notification signal indicates that the circuit board is pulled out, execute 503; and if the notification signal indicates that the circuit board is inserted, execute 504;

503: Same as 203; and
504: Same as 204.

Optionally, other circuit boards connected to the slot where the pulled out circuit board is located may be all or a part of the circuit boards except the pulled out circuit board on the optical backplane. In the same way, other circuit boards connected to the slot where the inserted circuit board is located may also be all or a part of the circuit boards except the inserted circuit board on the optical backplane. The querying relating to the pulled out circuit board and the inserted circuit board may be performed in a mapping relationship table between a transmitting port and a slot, and the querying result may be one or more transmitting ports.

Optionally, the preset thresholds relating to both the first control instruction and the second control instruction may be set or changed according to a need.

The circuit board in this embodiment includes, but is not limited to: a service board, a switch board, a main control board, and a circuit board that integrates a switch board and a main control board.

In the foregoing method provided in this embodiment, through detecting whether a circuit board is pulled out from an optical backplane, and when a circuit board is pulled out, transmitting a first control instruction to a transmitting port of another circuit board connected to a slot where the pulled out circuit board is located, and notifying of closing the transmitting port or adjusting output power thereof to make it below a preset threshold, optical signal leakage of the optical connector on the slot where the pulled out circuit board is located is prevented, thereby avoiding injuries to an operator, especially to eyes. In addition, the detecting whether a circuit board is pulled out from the optical backplane includes multiple manners: detecting based on the in-position detection signal, detecting based on the insertion stable detection signal and the in-position detection signal, detecting based on the open-closed detection signal, or detecting based on the notification signal of the software interface, thereby providing multiple implementation manners, the application is flexible, and the practicability is strong. In addition, through closing an optical channel not in working, power consumption of the system may be reduced, besides, through controlling based on a slot instead of controlling based on each optical path, optical path detection for each optical path is not needed, thereby greatly reducing complexity and system costs.

Embodiment 3

Figure 6:
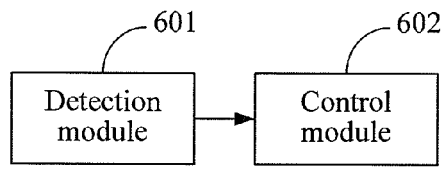
FIG. 6 is a structural diagram of an optical signal control system provided by Embodiment 3 of the present invention.

Referring to FIG. 6, this embodiment provides an optical signal control system, where the system includes:

a detection module 601, configured to detect whether a circuit board is pulled out from an optical backplane; and a control module 602, configured to: if the detection module 601 detects that the circuit board is pulled out, query a transmitting port of another circuit board connected to a slot where the pulled out circuit board is located, and transmit a first control instruction to the transmitting port, where the first control instruction is used to notify of closing the transmitting port or adjusting output power of the transmitting port to make it below a preset threshold, and the preset threshold is a specified boundary value used to determine whether the transmitting port is in a working state.

In this embodiment, the optical backplane at least has two data slots, and the data slot includes a service board slot or a switch board slot, one of the data slots acts as a slot where the pulled out circuit board is located, and the other or multiple of the data slots act as a slot where another circuit board is located. The slot where the circuit board is located has an optical connector, which is used for connection of optical signals, and also has an electric connector, which is used for transmission of the first control instruction. Each circuit board may have a group of TX and RX ports, and may also have multiple groups of TX and RX ports.

In this embodiment, the detection module 601 may be configured to:

detect whether the circuit board is pulled out from the optical backplane according to an in-position detection signal on the optical backplane, or according to the in-position detection signal and an insertion stable detection signal on the optical backplane; or detect whether the circuit board is pulled out from the optical backplane according to an open-closed detection signal generated after a user operates a control button, or according to a notification signal of inserting the circuit board transmitted by the user through a software interface.

In this embodiment, the control module 602 is further configured to: if the detection module 601 detects that a circuit board is inserted, query a transmitting port of another circuit board connected to a slot where the inserted circuit board is located, transmit a second control instruction to the transmitting port, and notify of opening the transmitting port or adjusting output power of the transmitting port to make it above the preset threshold.

Optionally, other circuit boards connected to the slot where the pulled out circuit board is located may be all or a part of the circuit boards except the pulled out circuit board on the optical backplane. In the same way, other circuit boards connected to the slot where the inserted circuit board is located may also be all or a part of the circuit boards except the inserted circuit board on the optical backplane. The querying relating to the pulled out circuit board and the inserted circuit board may be performed in a mapping relationship table between a transmitting port and a slot, and the querying result may be one or more transmitting ports. The mapping relationship table between the transmitting port and the slot is usually stored on the main control board in the optical backplane system.

Optionally, the preset thresholds relating to both the first control instruction and the second control instruction may be set or changed according to a need.

The circuit board in this embodiment includes, but is not limited to: a service board, a switch board, a main control board, and a circuit board that integrates a switch board and a main control board.

In this embodiment, the control module 602 may be located in a slot having no optical connector, for example, be located in a slot where the main control board is located, or be located in a slot having an optical connector, and for example, be located in a slot where the switchboard is located, or be located in a slot where a combination of a switch board and a main control board is located.

This embodiment further provides an optical backplane system, including an optical signal control system in any one of the foregoing implementation. The optical backplane has more than two slots, where at least one slot of the more than two slots is the slot where the pulled out circuit board is located, and at least one slot in the rest slots is inserted with another circuit board. The optical signal control system is located in a slot having no optical connector or a slot having an optical connector in the more than two slots.

In the optical signal control system provided in this embodiment, through detecting, by a detection module, whether a circuit board is pulled out from an optical backplane, and when a circuit board is pulled out, transmitting, by a control module, a first control instruction to a transmitting port of another circuit board connected to a slot where the pulled out circuit board is located, and notifying of closing the transmitting port or adjusting output power thereof to make it below a preset threshold, optical signal leakage of the optical connector on the slot where the pulled out circuit board is located is prevented, thereby avoiding injuries to an operator, especially to eyes. In addition, through closing an optical channel not in working, power consumption of the system may be reduced, besides, through controlling based on a slot instead of controlling based on each optical path, optical path detection for each optical path is not needed, thereby greatly reducing complexity and system costs.

Embodiment 4

Figure 7:
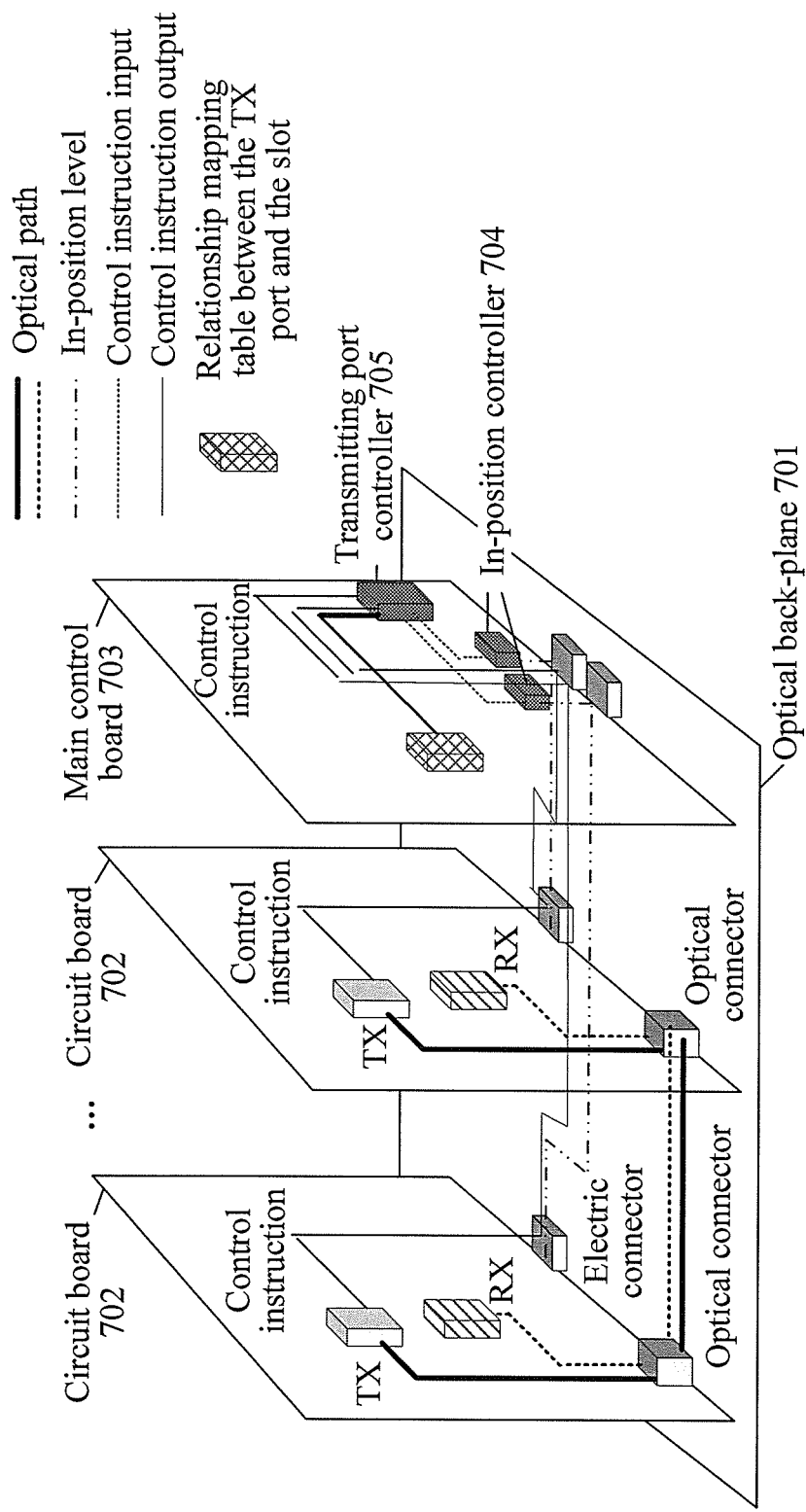
FIG. 7 is a structural diagram of an optical backplane system provided by Embodiment 4 of the present invention.

Referring to FIG. 7, this embodiment provides an optical backplane system, in which control is performed based on an in-position detection signal. The system includes an optical backplane 701, a circuit board 702 and a main control board 703, and further includes an optical signal control system. The optical signal control system includes:

an in-position detection controller 704, configured to detect an in-position detection signal on the optical backplane 701; if the in-position detection signal is a specified first level, determine that the circuit board 702 is pulled out from the optical backplane 701; and if the in-position detection signal is a specified second level, determine that the circuit board 702 is inserted into the optical backplane 701, where the specified first level is a high level, and the second level is a low level; or the specified first level is a low level, and the second level is a high level; and a transmitting port controller 705, configured to: if the in-position detection controller 704 detects that the circuit board 702 is pulled out, query a transmitting port of another circuit board 702 connected to a slot where the pulled out circuit board 702 is located, and transmit a first control instruction to the transmitting port, where the first control instruction is used to notify of closing the transmitting port or adjusting output power of the transmitting port to make it below a preset threshold, and the preset threshold is a specified boundary value used to determine whether the transmitting port is in a working state.

Figure 8:
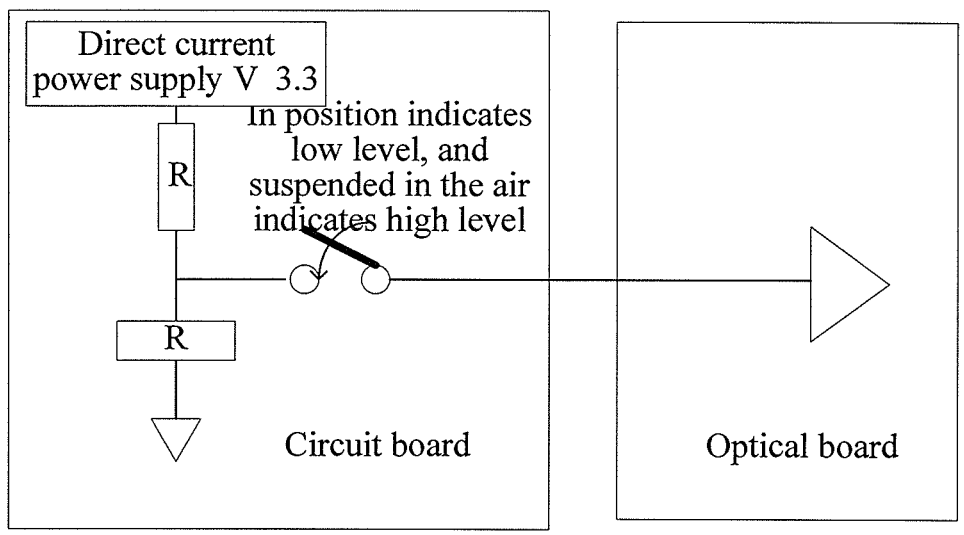
FIG. 8 is a schematic diagram illustrating the principle of an in-position detection controller of Embodiment 4 of the present invention.

In this embodiment, each slot of the optical backplane 701 is disposed with at least one in-position detection signal, that is, a level signal. The in-position detection controller 704 may determine, according to an in-position detection signal of each slot, whether the slot has a circuit board inserted into or has a circuit board pulled out. The detecting principle of the in-position detection controller 704 is shown in FIG. 8. A switch in the figure is an exemplary switch, and does not represent a true switch, but represents an inserted-pulled-out state of the circuit board. The connection of the switch represents that the circuit board is inserted, that is, in position, and at this time, the circuit board is connected to the ground in the optical backplane, which is a low level. The disconnection of the switch represents that the circuit board is pulled out, that is, hanging in the air, and at this time, the circuit board is not connected to the ground in the optical backplane, two resistors R in the circuit board are connected, which is a high level. According to the principle, the in-position detection controller may determine, according to that the in-position detection signal is a high level, that a circuit board is pulled out from the optical backplane; determine, according to that the in-position detection signal is a low level, that the circuit board is inserted into the optical backplane.

In this embodiment, further, the transmitting port controller 705 is further configured to: if the in-position detection controller 704 detects that a circuit board is inserted, query a transmitting port of another circuit board connected to a slot where the inserted circuit board is located, transmit a second control instruction to the transmitting port, and notify of opening the transmitting port or adjusting the output power of the transmitting port to make it above the preset threshold.

In this embodiment, the in-position detection controller 704, after detecting that the level of a slot is changed, may generate a control instruction to the transmitting port controller 705, so as to instruct an operation on the transmitting port. The in-position detection controller 704, when detects the first level, determines that a circuit board is pulled out, and may transmit a first control instruction to the transmitting port controller 705. After receiving the first control instruction, the transmitting port controller 705 queries a mapping relationship table between a transmitting port and a slot, and finds a transmitting port of another circuit board connected to a slot where the pulled out circuit board is located, thereby transmitting the first control instruction to the found transmitting port, and notifying of closing the transmitting port or adjusting output power of the transmitting port to make it below a preset threshold.

When detecting the second level, the in-position detection controller 704 determines that a circuit board is inserted, and transmits a second control instruction to the transmitting port controller 705. After receiving the second control instruction, the transmitting port controller 705 queries the mapping relationship table between a transmitting port and a slot, finds a transmitting port of another circuit board connected to a slot where the inserted circuit board, and transmits the second control instruction to the transmitting port, where the second control instruction is used to notify of opening the transmitting port or adjusting the output power of the transmitting port to make it above the preset threshold.

In this way, when the circuit board is pulled out, the transmitting ports of the circuit boards of all the other slots connected to the slot are closed, thereby implementing protection for the operator. When the circuit board is inserted, the transmitting ports of the circuit boards of all the other slots connected to the slot begin to transmit optical signals, thereby implementing connection to a signal channel connected to the slot.

In this embodiment, the in-position detection controller 704 is located on the main control board. The transmitting port controller 705 may be located in a slot having an optical connector, for example, be located in a slot where the main control board is located, or be located in a slot having an optical connector, and for example, be located in a slot where the switch board is located, or be located in a slot where a combination of a switch board and a main control board is located, which is not specifically limited by the embodiment of the present invention. The transmitting port controller 705 may be a CPU on the main control board, and the mapping relationship table between a transmitting port and a slot may be stored in a storage medium on the main control board, such as a mechanical hard disk, a solid state disk, and so on. The mapping relationship table between a transmitting port and a slot may be shown in Table 1 below.

TABLE 1

| Slot number | 1 | 2 | 3 | ... | N |
|---|---|---|---|---|---|
| 1 | — | n1, n2 | n1, n3, n4 | ... | n5, n6 ... |
| 2 | n2, n8 ... | — | n3, n7 | ... | n1, n2 ... |
| 3 | n1 ... | n6 | — | ... | n1, n2 ... |
| ... | ... | ... | ... | — | ... |
| N | n1, n2 | n3, n4 | n5, n6, n7 | ... | — |

Table 1 shows a mapping relationship table between a transmitting port and a slot in N slots. 1, 2, 3 ... N represent N slots on the optical backplane into which N circuit boards may be inserted. n1, n2, n3, n4, n5 ... represent a transmitting port number of an m slot, where m is between 1 and N. For example, the third column in Table 1 represents a transmitting port connected to a slot 2, including: n1, n2 transmitting ports of a slot 1, an n6 transmitting port of a slot 3 ... and n3, n4 transmitting ports of a slot N. An example is taken for illustration in the following, assuming that N circuit boards are inserted into the optical backplane, the mapping relationship table between a transmitting port and a slot is shown in Table 1. If the circuit board on the slot 2 is pulled out, the in-position detection signal is changed into the first level, the in-position detection controller on the main control board may detect the first level through an electric connector, and therefore, the controller may transmit a first control instruction to the transmitting port controller. After receiving the first control instruction, the transmitting port controller performs query in Table 1, and obtains all the transmitting ports in the third column, including: n1, n2 transmitting ports of the slot 1, the n6 transmitting port of the slot 3 ... and n3, n4 transmitting ports of the slot N, and then transmits the first control instruction to all the found transmitting ports, thereby ensuring no optical signal leakage on the slot when the circuit board on the slot 2 is pulled out, and ensuring the safety of the operator.

The circuit board in this embodiment includes, but is not limited to: a service board, a switch board, a main control board, and a circuit board that integrates a switch board and a main control board.

In the optical backplane system provided in this embodiment, through detecting, by an in-position detection controller, whether a circuit board is pulled out from an optical backplane, and when a circuit board is pulled out, transmitting, by a transmitting port controller, a first control instruction to a transmitting port of another circuit board connected to a slot where the pulled out circuit board is located, and notifying of closing the transmitting port or adjusting output power thereof to make it below a preset threshold, optical signal leakage of the optical connector on the slot where the pulled out circuit board is located is prevented, thereby avoiding injuries to an operator, especially to eyes. In addition, through closing an optical channel not in working, power consumption of the system may be reduced, besides, through controlling based on a slot instead of controlling based on each optical path, optical path detection for each optical path is not needed, thereby greatly reducing complexity and system costs.

Embodiment 5

Figure 9:
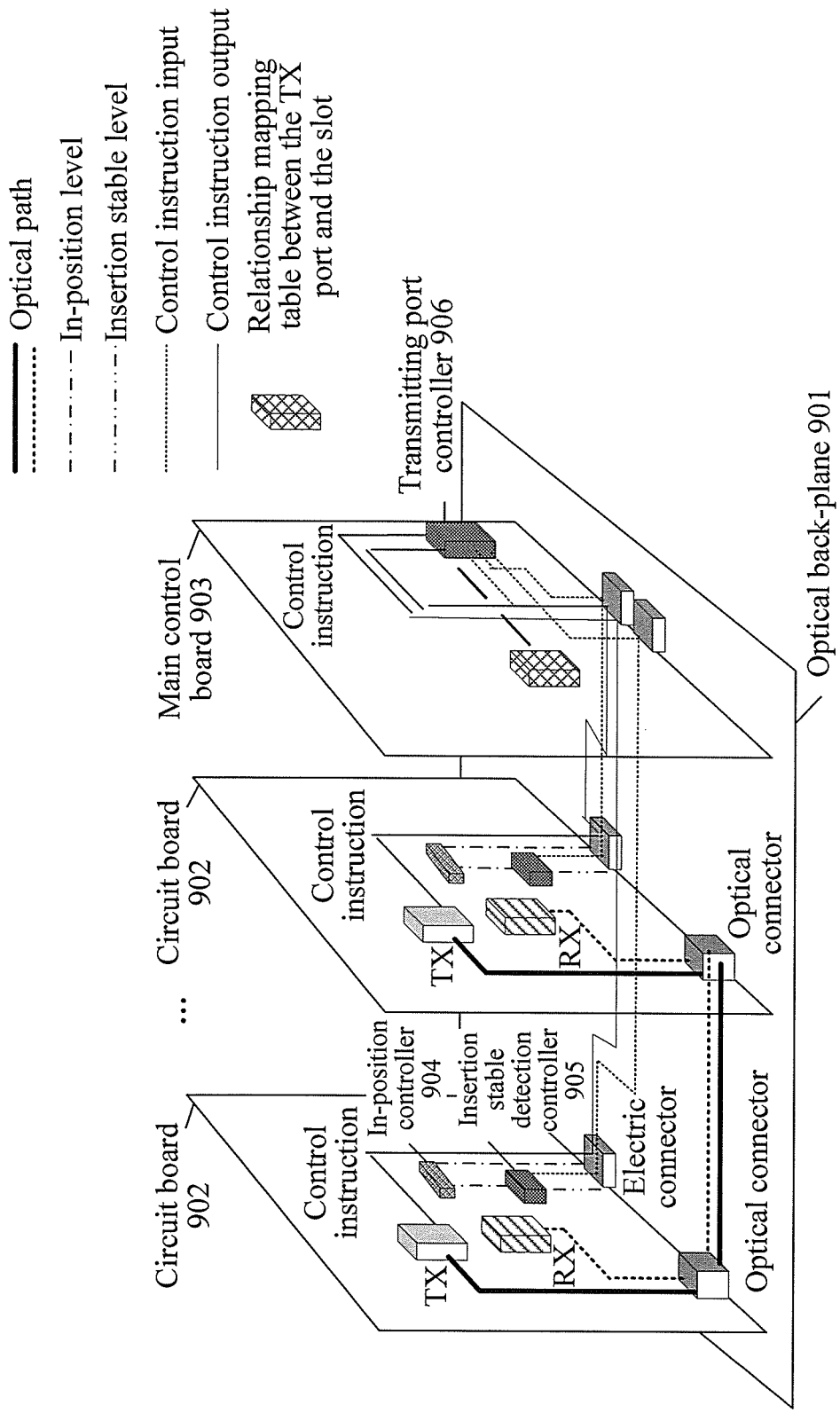
FIG. 9 is a structural diagram of an optical backplane system provided by Embodiment 5 of the present invention.

Referring to FIG. 9, this embodiment provides an optical backplane system, in which control is performed through an in-position detection signal and an insertion stable detection signal. The system includes an optical backplane 901, a circuit board 902 and a main control board 903, and further includes an optical signal control system. The optical signal control system includes:

an in-position detection controller 904, configured to detect an in-position detection signal on the optical backplane 901;

an insertion stable detection controller 905, configured to: if the in-position detection signal detected by the in-position detection controller 904 is a specified fourth level, detect an insertion stable detection signal on the optical backplane 901, if the insertion stable detection signal is a specified third level, determine that the circuit board 902 is pulled out from the optical backplane 901; and if the insertion stable detection signal is a fourth level, determine that the circuit board 902 is inserted into the optical backplane 901, where the specified third level is a high level, and the fourth level is a low level; or the third level is a low level, and the fourth level is a high level; and a transmitting port controller 906, configured to: if the insertion stable detection controller 905 detects that the circuit board 902 is pulled out, query a transmitting port of another circuit board 902 connected to a slot where the pulled out circuit board 902 is located, and transmit a first control instruction to the transmitting port, where the first control instruction is used to notify of closing the transmitting port or adjusting output power of the transmitting port to make it below a preset threshold, and the preset threshold is a specified boundary value used to determine whether the transmitting port is in a working state.

Both the in-position detection controller 904 and the insertion stable detection controller 905 are located on the pulled out circuit board 902, a slot where the pulled out circuit board 902 is located has an electric connector, and a pin connected to the insertion stable detection signal and in the electric connector is shorter than a pin connected to the in-position detection signal. In this way, during a pulling out process of the circuit board, the insertion stable detection controller on the circuit board may first detect a level change of the insertion stable detection signal, and then the in-position detection controller detects a change of the in-position detection signal, so as to ensure that a control instruction is transmitted to the main control board through a pin of an electric connector and via the optical backplane before the circuit board is not pulled out totally, and then the transmitting port controller 906 on the main control board transmits a control signal to the transmitting port of the another circuit board in time, thereby preventing optical signal leakage. In this embodiment, the in-position detection signal and the insertion stable detection signal may be defined on the same electric connector having a long pin and a short pin, and may also be defined to be implemented in two electric connectors with different signal pin heights, which is not limited by the embodiment of the present invention.

Preferably, in the optical backplane system in this embodiment, each circuit board has the in-position detection controller 904 and the insertion stable detection controller 905, so as to detect pulling out of any one circuit board.

In this embodiment, each slot of the optical backplane 901 is disposed with at least one in-position detection signal and one insertion stable detection signal. The internal circuit of the in-position detection controller 904 is the same as Embodiment 4, which is not described again herein.

In this embodiment, further, the transmitting port controller 906 is further configured to: if the insertion stable detection controller 905 detects that a circuit board is inserted, query a transmitting port of another circuit board connected to a slot where the inserted circuit board is located, and transmit a second control instruction to the transmitting port, where the second control instruction is used to notify of opening the transmitting port or adjusting the output power of the transmitting port to make it above the preset threshold.

In this embodiment, when the in-position detection controller 904 detects that an in-position detection signal of a slot is a fourth level, and the insertion stable detection controller 905 detects that an insertion stable detection signal of the slot is a third level, the insertion stable detection controller 905 determines that a circuit board is pulled out, and may transmit a first control instruction to the transmitting port controller 906. After receiving the first control instruction, the transmitting port controller 906 queries a mapping relationship table between a transmitting port and a slot, and finds a transmitting port of another circuit board connected to a slot where the pulled out circuit board is located, thereby transmitting the first control instruction to the found transmitting port, and notifying of closing the transmitting port or adjusting output power of the transmitting port to make it below a preset threshold.

When the in-position detection controller 904 detects that an in-position detection signal of a slot is a fourth level, and the insertion stable detection controller 905 detects that an insertion stable detection signal of the slot is also a fourth level, the insertion stable detection controller 905 determines that a circuit board is inserted, and may transmit a second control instruction to the transmitting port controller 906. After receiving the second control instruction, the transmitting port controller 906 queries the mapping relationship table between a transmitting port and a slot, and finds a transmitting port of another circuit board connected to a slot where the inserted circuit board is located, thereby transmitting the second control instruction to the found transmitting port, and notifying of opening the transmitting port or adjusting the output power of the transmitting port to make it above the preset threshold.

In this way, when the circuit board is pulled out, the transmitting ports of the circuit boards of all the other slots connected to the slot are closed, thereby implementing protection for the operator. When the circuit board is inserted, the transmitting ports of the circuit boards of all the other slots connected to the slot begin to transmit optical signals, thereby implementing connection to a signal channel connected to the slot.

In this embodiment, the transmitting port controller 906 may be located in a slot having no optical connector, for example, be located in a slot where the main control board is located, or be located in a slot having an optical connector, and for example, be located in a slot where the switch board is located, or be located in a slot where a combination of a switch board and a main control board is located, which is not specifically limited by the embodiment of the present invention. The transmitting port controller 906 may be a CPU on the main control board, and the mapping relationship table between a transmitting port and a slot may be stored in a storage medium on the main control board, such as a mechanical hard disk, a solid state disk, and so on.

The circuit board in this embodiment includes, but is not limited to: a service board, a switch board, a main control board, and a circuit board that integrates a switch board and a main control board.

In the optical backplane system provided in this embodiment, through detecting, by an in-position detection controller and an insertion stable detection controller, whether a circuit board is pulled out from an optical backplane, and when a circuit board is pulled out, transmitting, by a transmitting port controller, a first control instruction to a transmitting port of another circuit board connected to a slot where the pulled out circuit board is located, and notifying of closing the transmitting port or adjusting output power thereof to make it below a preset threshold, optical signal leakage of the optical connector on the slot where the pulled out circuit board is located is prevented, thereby avoiding injuries to an operator, especially to eyes. In addition, through closing an optical channel not in working, power consumption of the system may be reduced, besides, through controlling based on a slot instead of controlling based on each optical path, optical path detection for each optical path is not needed, thereby greatly reducing complexity and system costs.

Embodiment 6

Figure 10:
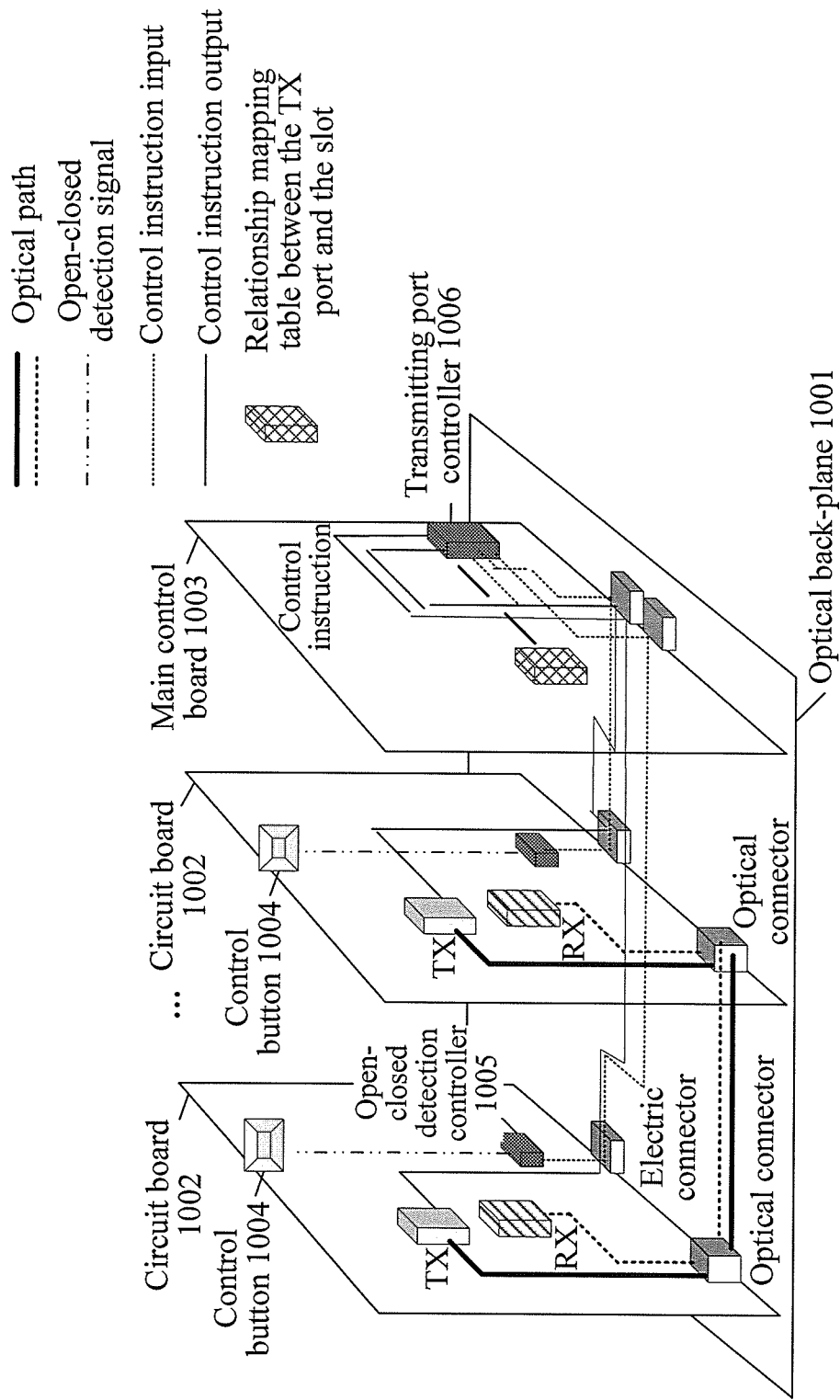
FIG. 10 is a structural diagram of an optical backplane system provided by Embodiment 6 of the present invention.

Referring to FIG. 10, this embodiment provides an optical backplane system, in which control is performed through an open-closed detection signal. The system includes an optical backplane 1001, a circuit board 1002 and a main control board 1003, and may further include an optical signal control system, and the optical signal control system includes a control button 1004, an open-closed detection controller 1005 and a transmitting port controller 1006, where the control button 1004 is connected to the open-closed detection controller 1005, and both are located on the pulled out circuit board 1002.

The control button 1004 is configured to generate an open-closed detection signal according to an operation of a user.

The open-closed detection controller 1005 is configured to detect the open-closed detection signal generated by the control button 1004; if the open-closed detection signal is a closed signal, determine that the circuit board 1002 is pulled out from the optical backplane 1001; and if the open-closed detection signal is an opened signal, determine that the circuit board 1002 is inserted into the optical backplane 1001.

The transmitting port controller 1006 is configured to: if the open-closed detection controller 1005 detects that the circuit board 1002 is pulled out, query a transmitting port of another circuit board 1002 connected to a slot where the pulled out circuit board 1002 is located, and transmit a first control instruction to the transmitting port, where the first control instruction is used to notify of closing the transmitting port or adjusting output power of the transmitting port to make it below a preset threshold, and the preset threshold is a specified boundary value used to determine whether the transmitting port is in a working state.

Preferably, in the optical backplane system in this embodiment, each circuit board has the control button 1004 and the open-closed detection controller 1005, so as to detect pulling out of any one circuit board conveniently.

In this embodiment, further, the transmitting port controller 1006 is further configured to: if the open-closed detection controller 1005 detects that a circuit board 1002 is inserted, query a transmitting port of another circuit board 1002 connected to a slot where the inserted circuit board 1002 is located, transmit a second control instruction to the transmitting port, and notify of opening the transmitting port or adjusting the output power of the transmitting port to make it above the preset threshold.

In this embodiment, when a user is going to pull out the circuit board, the user first operates the control button 1004 to a closed state, and the control button 1004 may generate a corresponding open-closed detection signal. The open-closed detection controller 1005 may detect that the open-closed detection signal is a closed signal, determines that a circuit board is pulled out, and may transmit a first control instruction to the transmitting port controller 1006. After receiving the first control instruction, the transmitting port controller 1006 queries a mapping relationship table between a transmitting port and a slot, and finds a transmitting port of another circuit board connected to a slot where the pulled out circuit board is located, thereby transmitting the first control instruction to the found transmitting port, and notifying of closing the transmitting port or adjusting output power of the transmitting port to make it below a preset threshold.

After inserting the circuit board, the user operates the control button 1004 to an opening state. The control button 1004 may generate a corresponding open-closed detection signal. The open-closed detection controller 1005 may detect that the open-closed detection signal is an opened signal, determines that the circuit board is inserted, and may transmit a second control instruction to the transmitting port controller 1006. After receiving the second control instruction, the transmitting port controller 1006 queries the mapping relationship table between a transmitting port and a slot, and finds a transmitting port of another circuit board connected to a slot where the inserted circuit board is located, thereby transmitting the second control instruction to the found transmitting port, and notifying of opening the transmitting port or adjusting the output power of the transmitting port to make it above the preset threshold.

In this way, when the circuit board is pulled out, the transmitting ports of the circuit boards of all the other slots connected to the slot are closed, thereby implementing protection for the operator. When the circuit board is inserted, the transmitting ports of the circuit boards of all the other slots connected to the slot begin to transmit optical signals, thereby implementing connection to a signal channel connected to the slot.

In this embodiment, the transmitting port controller 1006 may be located in a slot having no optical connector, for example, be located in a slot where the main control board is located, or be located in a slot having an optical connector, and for example, be located in a slot where the switch board is located, or be located in a slot where a combination of a switch board and a main control board is located, which is not specifically limited by the embodiment of the present invention. The transmitting port controller 1006 may be a CPU on the main control board, and the mapping relationship table between a transmitting port and a slot may be stored in a storage medium on the main control board, such as a mechanical hard disk, a solid state disk, and so on.

The circuit board in this embodiment includes, but is not limited to: a service board, a switch board, a main control board, and a circuit board that integrates a switchboard and a main control board.

In the optical backplane system provided in this embodiment, through detecting, by a control button and an open-closed detection controller, whether a circuit board is pulled out from an optical backplane, and when a circuit board is pulled out, transmitting, by a transmitting port controller, a first control instruction to a transmitting port of another circuit board connected to a slot where the pulled out circuit board is located, and notifying of closing the transmitting port or adjusting output power thereof to make it below a preset threshold, optical signal leakage of the optical connector on the slot where the pulled out circuit board is located is prevented, thereby avoiding injuries to an operator, especially to eyes. In addition, through closing an optical channel not in working, power consumption of the system may be reduced, besides, through controlling based on a slot instead of controlling based on each optical path, optical path detection for each optical path is not needed, thereby greatly reducing complexity and system costs.

Embodiment 7

Figure 11:
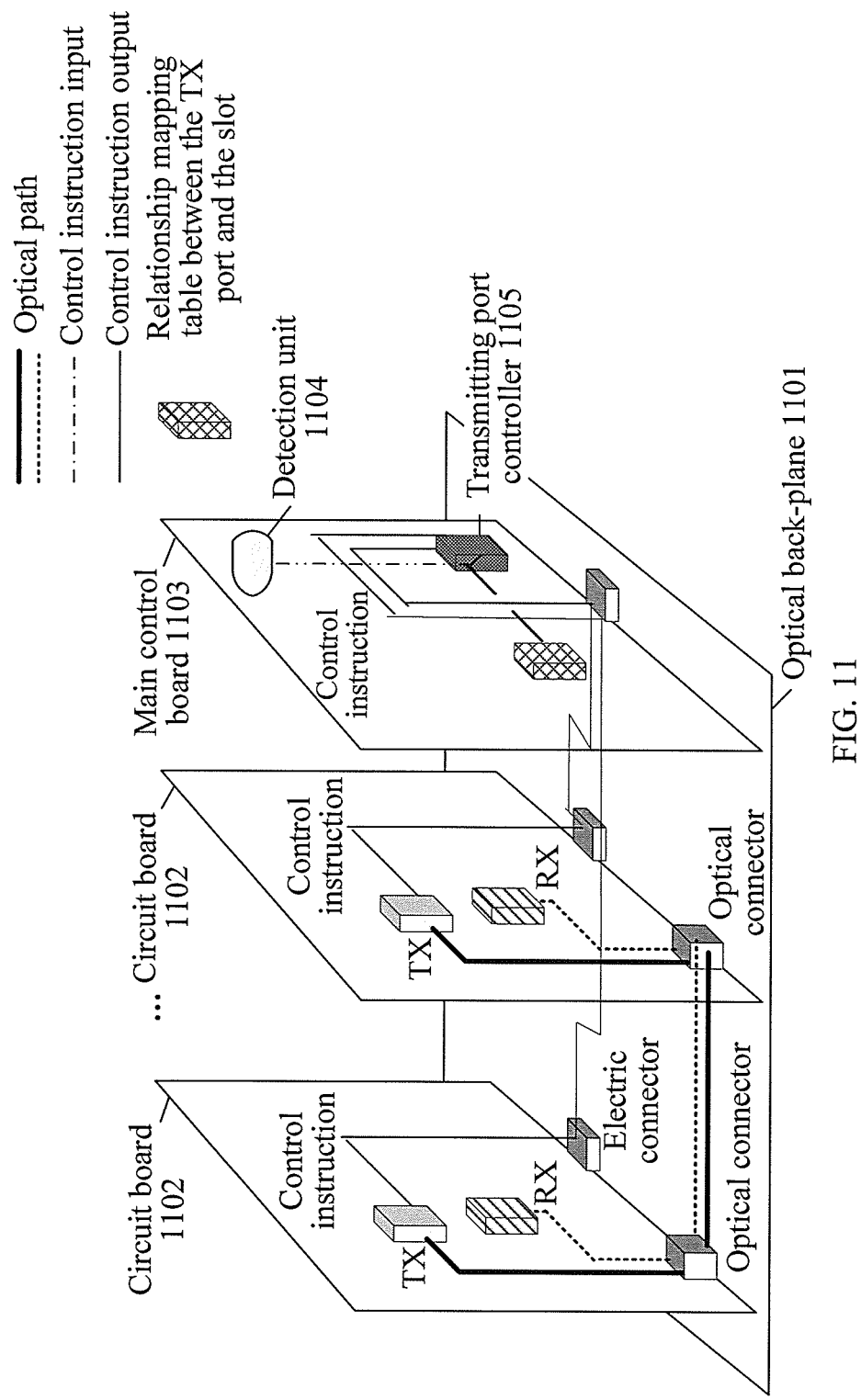
FIG. 11 is a structural diagram of an optical backplane system provided by Embodiment 7 of the present invention.

Referring to FIG. 11, this embodiment provides an optical backplane system, in which control is performed through a notification signal of a software interface. The system includes an optical backplane 1101, a circuit board 1102 and a main control board 1103, and further includes an optical signal control system. The optical signal control system includes:

a detection unit 1104, configured to receive a notification signal of inserting the circuit board transmitted by the user through a software interface, if the notification signal indicates that a circuit board is pulled out, determine that the circuit board 1102 is pulled out from the optical backplane 1101; and if the notification signal indicates that a circuit board is inserted, determine that the circuit board 1102 is inserted into the optical backplane 1101; and a transmitting port controller 1005, configured to: if the detection controller 1104 detects that the circuit board 1102 is pulled out, query a transmitting port of another circuit board 1102 connected to a slot where the pulled out circuit board 1102 is located, and transmit a first control instruction to the transmitting port, where the first control instruction is used to notify of closing the transmitting port or adjusting output power of the transmitting port to make it below a preset threshold, and the preset threshold is a specified boundary value used to determine whether the transmitting port is in a working state.

The detection unit 1104 and the transmitting port controller 1105 in this embodiment may be located on the main control board 1103.

In this embodiment, further, the transmitting port controller 1105 is further configured to: if the detection unit 1104 detects that a circuit board 1102 is inserted, query a transmitting port of another circuit board 1102 connected to a slot where the inserted circuit board 1102 is located, transmit a second control instruction to the transmitting port, and notify of opening the transmitting port or adjusting the output power of the transmitting port to make it above the preset threshold.

In this embodiment, when the user is going to pull out the circuit board, the user first clicks a corresponding button on a software interface, and transmits a notification signal of pulling out the circuit board. The detection unit 1104 may detect that the notification signal indicates that the circuit board is pulled out, determines that the circuit board is pulled out, and may transmit a first control instruction to the transmitting port controller 1105. After receiving the first control instruction, the transmitting port controller 1105 queries a mapping relationship table between a transmitting port and a slot, and finds a transmitting port of another circuit board connected to a slot where the pulled out circuit board is located, thereby transmitting the first control instruction to the found transmitting port, and notifying of closing the transmitting port or adjusting output power of the transmitting port to make it below a preset threshold.

After inserting the circuit board, the user clicks a corresponding button on the software interface, and transmits a notification signal of inserting the circuit board. The detection unit 1104 may detect that the notification signal indicates that the circuit board is inserted, determines that the circuit board is inserted, and may transmit a second control instruction to the transmitting port controller 1105. After receiving the second control instruction, the transmitting port controller 1105 queries the mapping relationship table between a transmitting port and a slot, and finds a transmitting port of another circuit board connected to a slot where the inserted circuit board is located, thereby transmitting the second control instruction to the found transmitting port, and notifying of opening the transmitting port or adjusting the output power of the transmitting port to make it above the preset threshold.

In this way, when the circuit board is pulled out, the transmitting ports of the circuit boards of all the other slots connected to the slot are closed, thereby implementing protection for the operator. When the circuit board is inserted, the transmitting ports of the circuit boards of all the other slots connected to the slot begin to transmit optical signals, thereby implementing connection to a signal channel connected to the slot.

In this embodiment, the transmitting port controller 1105 may be located in a slot having no optical connector, for example, be located in a slot where the main control board is located, or be located in a slot having an optical connector, and for example, be located in a slot where the switch board is located, or be located in a slot where a combination of a switch board and a main control board is located, which is not specifically limited by the embodiment of the present invention. The transmitting port controller 1105 may be a CPU on the main control board, and the mapping relationship table between a transmitting port and a slot may be stored in a storage medium on the main control board, such as a mechanical hard disk, a solid state disk, and so on.

The circuit board in this embodiment includes, but is not limited to: a service board, a switch board, a main control board, and a circuit board that integrates a switchboard and a main control board.

In the optical backplane system provided in this embodiment, through detecting a notification signal of inserting or pulling the circuit board transmitted by a software interface, whether a circuit board is pulled out from an optical backplane is detected, and when a circuit board is pulled out, through transmitting, by a transmitting port controller, a first control instruction to a transmitting port of another circuit board connected to a slot where the pulled out circuit board is located to notifying of closing the transmitting port or adjusting output power thereof to make it below a preset threshold, optical signal leakage of the optical connector on the slot where the pulled out circuit board is located is prevented, thereby avoiding injuries to an operator, especially to eyes. In addition, through closing an optical channel not in working, power consumption of the system may be reduced, besides, through controlling based on a slot instead of controlling based on each optical path, optical path detection for each optical path is not needed, thereby greatly reducing complexity and system costs.

It should be finally noted that persons of ordinary skill in the art should understand that all or part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (ROM) or a random access memory (RAM), and the like.

Functional units in the embodiments of the present invention may be integrated into a processing module, or each of units may exist alone physically, or two or more units are integrated into a module. The integrated modules may be implemented in a form of hardware, or may be implemented in a form of software functional modules. When being implemented in the form of software functional modules and sold or used as an independent product, the integrated modules may also be stored in a computer readable storage medium. The foregoing storage medium may be a read-only memory, a magnetic disk or an optical disk. The above apparatuses and systems may perform the methods described in the method embodiments.

The foregoing describes only exemplary embodiments of the present invention and is not intended to limit the present invention. Any modification, equivalent replacement, or improvement made without departing the spirit and principle of the present invention shall fall within the protection scope of the present invention.

What is claimed is:

1. An optical signal control method, comprising:
   detecting whether a circuit board is pulled out from an optical backplane, and when detecting that the circuit board is pulled out, generating a first control instruction and transmitting the first control instruction to a transmitting port controller configured to receive the first control instruction; and
   if a circuit board is pulled out, querying a mapping relationship table between a transmitting port and a slot to find a transmitting port of another circuit board connected to a slot where the pulled out circuit board was located, and transmitting the first control instruction to the found transmitting port, wherein the first control instruction is used to notify of closing the transmitting port or adjusting output power of the transmitting port to make it below a preset threshold, and the preset threshold is a specified boundary value used to determine whether the transmitting port is in a working state.

2. The method according to claim 1, wherein detecting whether a circuit board is pulled out from the optical backplane comprises:
   detecting whether a circuit board is pulled out from the optical backplane according to an in-position detection signal on the optical backplane, or according to the in-position detection signal and an insertion stable detection signal on the optical backplane; or
   detecting whether a circuit board is pulled out from the optical backplane according to an open-closed detection signal, or according to a notification signal of inserting the circuit board transmitted through a software interface.

3. The method according to claim 1, wherein detecting whether the circuit board is pulled out from the optical backplane comprises:
   detecting an in-position detection signal on the optical backplane, wherein the in-position detection signal is used to indicate whether the circuit board is in position;
   if the in-position detection signal is a specified first level, determining that the circuit board is pulled out from the optical backplane; and
   if the in-position detection signal is a specified second level, determining that the circuit board is inserted into the optical backplane, wherein
   the first level is a high level, and the second level is a low level; or the first level is a low level, and the second level is a high level.

4. The method according to claim 1, wherein detecting whether the circuit board is pulled out from the optical backplane comprises:
   detecting an insertion stable detection signal and an in-position detection signal on the optical backplane, wherein the insertion stable detection signal is used to indicate whether the circuit board is inserted stably; the in-position detection signal is used to indicate whether the circuit board is in position;
   if the insertion stable detection signal is a specified one of a low level or a high level and the in-position detection signal is a specified one of the low level or the high level different than the level of the insertion stable detection signal, determining that the circuit board is pulled out from the optical backplane; and
   if both the insertion stable detection signal and the in-position detection signal are the same specified level, determining that the circuit board is inserted into the optical backplane.

5. The method according to claim 1, wherein detecting whether the circuit board is pulled out from the optical backplane comprises:
   detecting an open-closed detection signal, wherein the open-closed detection signal is used to indicate an inserted state and a pulled-out state of the circuit board;
   if the open-closed detection signal is a closed signal, determining that the circuit board is pulled out from the optical backplane; and
   if the open-closed detection signal is an opened signal, determining that the circuit board is inserted into the optical backplane.

6. The method according to claim 1, wherein detecting whether the circuit board is pulled out from the optical backplane comprises:
   receiving a notification signal of inserting the circuit board transmitted through a software interface, wherein the notification signal is used to indicate an inserted state and a pulled-out state of the circuit board;
   if the notification detection signal indicates that the circuit board is pulled out, determining that the circuit board is pulled out from the optical backplane; and
   if the notification signal indicates that the circuit board is inserted, determining that the circuit board is inserted into the optical backplane.

7. The method according to claim 1, further comprising:
   if a circuit board is inserted, querying a transmitting port of another circuit board connected to a slot where the inserted circuit board was located, transmitting a second control instruction to the transmitting port, wherein the second control instruction is used to notify of opening the transmitting port or adjusting output power of the transmitting port to make it above a preset threshold.

8. An optical signal control system, comprising:
a detection module; and
a control module coupled to the detection module;
the detection module configured to detect whether a circuit board is pulled out from an optical backplane, and when detecting that the circuit board is pulled out, generate a first control instruction and transmit the first control instruction to the control module;
the control module comprising a transmitting port controller configured to receive the first control instruction, the control module configured to: if the detection module detects that a circuit board is pulled out, query a mapping relationship table between a transmitting port and a slot to find a transmitting port of another circuit board connected to a slot where the pulled out circuit board was located, and transmit the first control instruction to the found transmitting port, wherein the first control instruction is used to notify of closing the transmitting port or adjusting output power of the transmitting port to make it below a preset threshold, and the preset threshold is a specified boundary value used to determine whether the transmitting port is in a working state.

9. The system according to claim 8, wherein the detection module is configured to:
detect whether a circuit board is pulled out from the optical backplane according to an in-position detection signal on the optical backplane, or according to the in-position detection signal and an insertion stable detection signal on the optical backplane; or
detect whether a circuit board is pulled out from the optical backplane according to an open-closed detection signal, or according to a notification signal of inserting the circuit board transmitted through a software interface.

10. The system according to claim 8, wherein the detection module is an in-position detection controller, configured to detect an in-position detection signal on the optical backplane, wherein the in-position detection signal is used to indicate whether the circuit board is in position; if the in-position detection signal is a specified first level, determine that the circuit board is pulled out from the optical backplane; and if the in-position detection signal is a specified second level, determine that the circuit board is inserted into the optical backplane, wherein
the first level is a high level, and the second level is a low level; or the first level is a low level, and the second level is a high level.

11. The system according to claim 8, wherein the detection module comprises an in-position detection controller and an insertion stable detection controller, and both are located on the pulled out circuit board;
the in-position detection controller is configured to detect an in-position detection signal on the optical backplane, wherein the in-position detection signal is used to indicate whether the circuit board is in-position; and
the insertion stable detection controller is configured to:
detect an insertion stable detection signal on the optical backplane when the in-position detection signal is a specified one of a low level or a high level, wherein the insertion stable detection signal is used to indicate whether the circuit board is inserted stably; if the insertion stable detection signal is a specified one of the low level or the high level different than the level of the in-position detection signal, determine that the circuit board is pulled out from the optical backplane; and if the insertion stable detection signal is the same specified level as the in-position detection signal, determine that the circuit board is inserted into the optical backplane, wherein
the slot where the pulled out circuit board is located has an electric connector, and a pin connected to the insertion stable detection signal in the electric connector is shorter than a pin connected to the in-position detection signal.

12. The system according to claim 8, wherein the detection module comprises a control button and an open-closed detection controller, the control button is connected to the open-closed detection controller, and both are located on the pulled out circuit board;
the control button is configured to generate an open-closed detection signal, wherein the open-closed detection signal is used to indicate an inserted state and a pulled-out state of the circuit board; and
the open-closed detection controller is configured to detect the open-closed detection signal generated by the control button; if the open-closed detection signal is a closed signal, determine that the circuit board is pulled out from the optical backplane; and if the open-closed detection signal is an opened signal, determine that the circuit board is inserted into the optical backplane.

13. The system according to claim 8, wherein the detection module comprises:
a detection unit, configured to receive a notification signal of inserting the circuit board transmitted through a software interface, wherein the notification signal is used to indicate an inserted state and a pulled-out state of the circuit board, if the notification signal indicates that the circuit board is pulled out, determine that the circuit board is pulled out from the optical backplane; and if the notification signal indicates that the circuit board is inserted, determine that the circuit board is inserted into the optical backplane.

14. The system according to claim 8, wherein the control module is further configured to: if the detection module detects that a circuit board is inserted, query a transmitting port of another circuit board connected to a slot where the inserted circuit board is located, and transmit a second control instruction to the transmitting port, wherein the second control instruction is used to notify of opening the transmitting port or adjusting output power of the transmitting port to make it above the preset threshold.

15. The system according to claim 8, wherein the control module is located in a slot having no optical connector of the optical backplane, or is located in a slot having an optical connector of the optical backplane.

16. An optical backplane system, comprising an optical backplane and a circuit board, and further comprising the optical signal control system according to claim 8, wherein the optical backplane has more than two slots, at least one slot of the more than two slots is the slot where the pulled out circuit board was located, at least one slot in the more than two slots includes another circuit board inserted therein, and the optical signal control system is located in a slot having no optical connector or a slot having an optical connector in the more than two slots.

* * * * *